(12) United States Patent
Buhri et al.

(10) Patent No.: US 8,181,329 B2
(45) Date of Patent: May 22, 2012

(54) METHOD FOR ANCHORING A FASTENING ELEMENT TO A STEEL MEMBER

(75) Inventors: Reinhard Buhri, Frastanz (AT); Walter Odoni, Planken (CH)

(73) Assignee: Hilti Aktiengesellschaft, Schaan (LI)

( * ) Notice: Subject to any disclaimer, the term of this patent is extended or adjusted under 35 U.S.C. 154(b) by 135 days.

(21) Appl. No.: 12/583,415

(22) Filed: Aug. 20, 2009

(65) Prior Publication Data

US 2010/0047014 A1   Feb. 25, 2010

(30) Foreign Application Priority Data

Aug. 21, 2008   (DE) .......................... 10 2008 041 409

(51) Int. Cl.
*B21D 39/00*   (2006.01)

(52) U.S. Cl. ............... 29/525.01; 29/525.11; 29/525.13; 403/408.1

(58) Field of Classification Search ............... 29/525.01, 29/525.13, 432.1, 798, 243.521, 525.11; 403/408.1
See application file for complete search history.

(56) References Cited

U.S. PATENT DOCUMENTS

| | | | | |
|---|---|---|---|---|
| 2,753,624 | A * | 7/1956 | Taylor | 29/524.1 |
| 6,640,414 | B2 * | 11/2003 | Stevenson et al. | 29/525.14 |
| 6,659,702 | B2 * | 12/2003 | Kitayama et al. | 411/546 |
| 6,976,701 | B2 * | 12/2005 | Gray et al. | 280/728.3 |

FOREIGN PATENT DOCUMENTS

| | | |
|---|---|---|
| DE | 202 09 675 U1 | 9/2002 |
| GB | 1 162 596 | 8/1969 |

* cited by examiner

*Primary Examiner* — Jermie Cozart
(74) *Attorney, Agent, or Firm* — Davidson, Davidson & Kappel, LLC

(57) ABSTRACT

A method for anchoring a fastening element to a flat steel member, in which the fastening element is driven into a blind hole previously drilled in the steel member is disclosed. Initially, in a first step of the method, a metal disk is adhesively bonded to the steel member. In a subsequent second step, a blind hole is drilled into the stack formed by the metal disk and the steel member and, in a subsequent third step, the fastening element is driven into the pre-drilled blind hole in the stack using a hand-held drive-in tool.

10 Claims, 1 Drawing Sheet

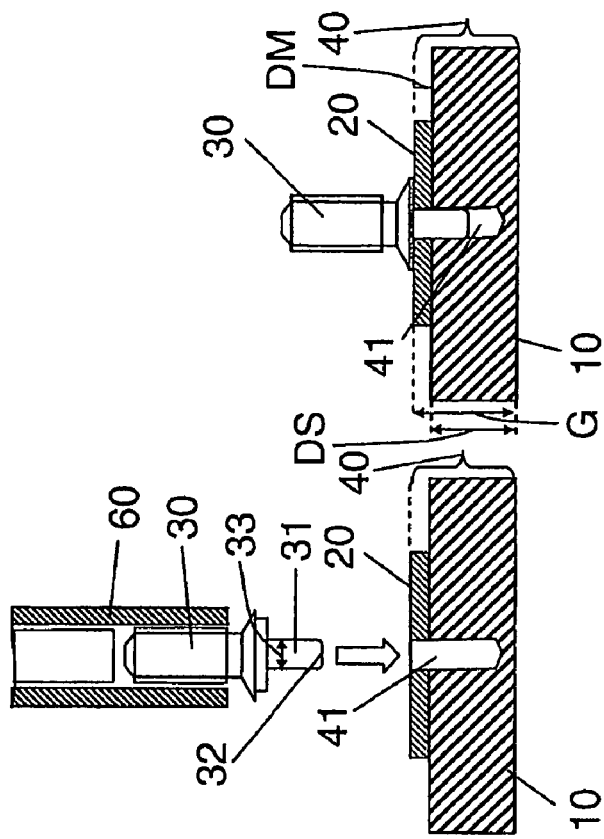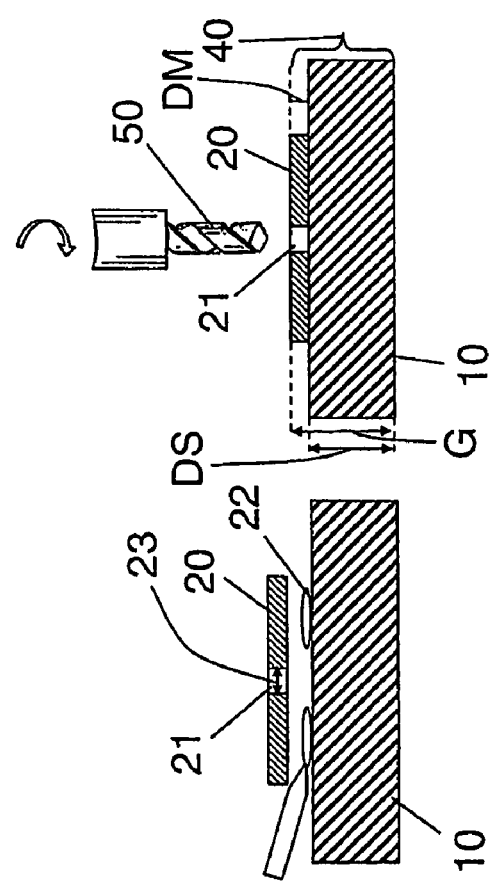

METHOD FOR ANCHORING A FASTENING ELEMENT TO A STEEL MEMBER

This claims priority to German Patent Application DE 10 2008 041 409.3, filed Aug. 21, 2008, the entire disclosure of which is hereby incorporated by reference herein.

The present invention relates to a method for anchoring a fastening element to a steel member, in which the fastening element is driven into a blind hole previously drilled in the steel member.

BACKGROUND OF THE INVENTION

German Utility Model DE 202 09 675 U1 describes such a method in which a fastening element having a blunt tip is driven into a blind hole previously drilled in a substrate.

The advantage of driving a fastening element into a pre-drilled blind hole, for example, in a steel plate or steel member, is that the back side of the steel plate remains intact. In order to achieve a secure anchorage to steel sheets when using this method, the steel structure or steel sheet must have a minimum thickness. The known method does not allow fastening elements to be securely anchored to thin steel sheets or steel members.

SUMMARY OF THE INVENTION

It is an object of the present invention to provide a method that allows a fastening element to be securely anchored even to a steel structure having a small steel or layer thickness.

Initially, in a first step of this method, a metal disk is adhesively bonded to the steel member. In a subsequent second step, a blind hole is drilled into the stack formed by the metal disk and the steel member and, in a subsequent third step, the fastening element is driven into the pre-drilled blind hole in the stack using a hand-held drive-in tool. The localized thickening of the steel member resulting from the metal disk being adhesively bonded thereto makes the amount of frictional heat generated as the fastening element is driven into the blind hole sufficient to cause a fastening portion of the shank of the fastening element in the blind hole to form a material-to-material bond, or welded bond with the steel member, even if the thickness of the steel member or steel sheet itself is too small.

It is advantageous to use a fastening element in the form of a pin, particularly a threaded pin, having a blunt tip. This prevents damage to the bottom of the blind hole, and thus, to the back side of the steel member facing away from the metal disk.

Moreover, it is advantages for the stack formed by the steel member and the metal disk to have an overall thickness of at least 8 mm, whereby sufficient frictional heat is generated as the fastening element is driven into the blind hole in the stack.

BRIEF DESCRIPTION OF THE DRAWINGS

The present invention will now be described with reference to an exemplary embodiment illustrated in the drawing, in which:

FIG. 1 shows a first step of the method of the present invention;

FIG. 2 depicts a second step of the method of the present invention;

FIG. 3 illustrates a third step of the method of the present invention;

FIG. 4 shows a fastening element anchored in a steel member using the method of the present invention.

DETAILED DESCRIPTION

FIGS. 1 through 4 depict a method according to the present invention. Initially, in a first step of the method according to the present invention, a metal disk 20 is adhesively bonded to a flat steel member 10, such as one or more steel sheets, as is shown in FIG. 1. The adhesive 22 can be applied to the bonding area as shown, or, alternatively, metal disk 20 is already provided with an adhesive coating. In a second step, shown in FIG. 2, a blind hole 41 is drilled into the stack 40 formed by steel member 10 and metal disk 20 using a drill bit 50. In a third step, shown in FIG. 3, a fastening element 30, particularly a threaded pin, having a preferably blunt (i.e., flat) tip is driven into blind hole 41 using a hand-held drive-in tool 60, such as a combustion-powered or electrically powered drive-in tool (FIG. 3 shows only the muzzle of the drive-in tool). The stack 40 formed by metal disk 20 and steel member 10 has an overall thickness G of at least 8 mm. Thickness DM of metal disk 20 adhesively bonded to steel member 10 is selected according to the given thickness of said steel member. The localized thickening of steel member 10 resulting from metal disk 20 being adhesively bonded thereto makes the amount of frictional heat generated as fastening element 30 is driven into blind hole 41 sufficient to cause a fastening portion 31 of the shank of fastening element 30 in blind hole 41 to form a material-to-material bond, or welded bond with steel member 10, thereby achieving a secure anchorage. Metal disk 20 is preferably made from a corrosion-resistant steel. Metal disk 20 may have a through-hole 21 whose diameter 23 is between 25 percent and 85 percent of shank diameter 33 of fastening portion 31. Through-hole 21 makes it easier to center drill bit 50 as it starts drilling into steel member 10.

What is claimed is:

1. A method for anchoring a fastening element to a flat steel member, in which the fastening element is driven into a blind hole previously drilled in the steel member, comprising the steps of:
   in a first step, adhesively bonding a metal disk to the steel member;
   in a subsequent second step, drilling a blind hole into the stack formed by the metal disk and the steel member;
   in a subsequent third step, driving the fastening element driven into the pre-drilled blind hole in the stack using a hand-held drive-in tool.

2. The method as recited in claim 1, wherein the fastening element used is in the form of a pin having a blunt tip.

3. The method as recited in claim 1, wherein an overall thickness of the stack formed by the steel member and the metal disk is at least 8 mm.

4. The method as recited in claim 2, wherein an overall thickness of the stack formed by the steel member and the metal disk is at least 8 mm.

5. The method as recited in claim 1 wherein the fastening element forms a material-to-material bond with the steel member, the material-to-material bond being generated by frictional heat during the third step.

6. The method as recited in claim 1 wherein the fastening element is a pin.

7. The method as recited in claim 6 wherein the pin is threaded.

8. The method as recited in claim 1 wherein the metal disk is provided with an adhesive coating prior to the first step.

9. The method as recited in claim 1 wherein the metal disk is made from corrosion-resistant steel.

10. The method as recited in claim 1 wherein the fastening element includes a shank having a shank diameter, and the metal disk has a through-hole with a diameter between 25 and 85 percent of the shank diameter.

* * * * *